Fred E. Littman
INVENTOR.
BY Max Geldin
ATTORNEY

United States Patent Office

3,560,232
Patented Feb. 2, 1971

3,560,232
MODIFIED CELLULOSE ESTER SEMIPERMEABLE MEMBRANE AND ITS METHOD OF MANUFACTURE
Fred E. Littman, Santa Ana, Calif., assignor to McDonnell Douglas Corporation, Santa Monica, Calif., a corporation of Maryland
Filed Dec. 29, 1967, Ser. No. 694,709
Int. Cl. B29d 27/04; C08b 3/00
U.S. Cl. 106—169
10 Claims

ABSTRACT OF THE DISCLOSURE

Cellulose ester, especially cellulose acetate, semipermeable membranes having superior permeation properties of flux and solute rejection which are particularly suited for desalination of aqueous salt solutions by reverse osmosis produced by a method which includes pretreatment of the cellulose ester material in the form of an inert solvent solution with catalytic amounts of a concentrated strong acid prior to casting the cellulose ester material into a film. Method for producing the above described membrane, and method for desalination of salt water employing the above described membrane.

---

This invention relates to cellulose ester, and particularly cellulose acetate, semipermeable membranes, and is particularly concerned with novel procedure for producing improved membranes of this type, to the improved cellulose ester and especially cellulose acetate, membranes so produced, and to a process for utilizing such membranes, particularly for desalination of aqueous salt solutions, employing such membranes.

Reverse osmosis describes the flow or diffusion from a concentrated solution to a dilute solution through a semipermeable membrane separating the two solutions when pressure in excess of osmotic pressure is applied to the concentrated solution.

There has been considerable interest in reverse osmosis since early reports of Reid, et al. (J. App. Poly Sci., vol. 1, p. 133 (1959); vol. 2, p. 264 (1959); and vol. 4, p. 354 (1960)) described the selective ability of cellulose acetate films to reject salt while remaining permeable to water. Since that time, extensive work has been directed to the development of improved semipermeable membranes which can be used to reduce the cost of desalination of sea water to a point which would be attractive as a source of pure water.

Experienced workers using cellulose acetate membranes have found that, in general, the salt rejection and flux rates are inversely proportional. Furthermore, decreased flux rates occur as a function of time due to compaction which increases over a period of use. These workers have, therefore, sought a membrane combining consistent high salt rejection at high flux over long periods.

In recent years certain procedures have been suggested for modification of cellulose ester, and especially cellulose acetate semipermeable membranes, in attempts to improve one or more of the permeation properties discussed above.

For example, the Martin et al. U.S. Pat. 3,140,256 has suggested modifying the permeation properties of cellulose ester membranes by treatment of the cellulose ester material either before or after casting into a film with an organic reagent selected from aldehydes, isocyanates and dibasic acids and their derivatives, which react with the free hydroxyl groups attached to the anhydroglucose units of the cellulose ester. Such membranes have been used to separate liquid mixtures of organic compounds.

It has been suggested by Watson et al. U.S. Pat. 3,250,701 that a high flux rate for an osmotic membrane can be maintained by intermittently relaxing the pressure applied to the feed solution and then repressurizing the system to resume continuous operation.

At present, the cellulose acetate membranes made according to the Loeb-Manjikian procedure which includes heat treatment of the cast membrane, exhibit a salt rejection rate of the order of about 95% at a flux rate of about 10 gallons/ft.$^2$/day, depending on the salt concentration of the feed solution, the pressure used in the reverse osmosis procedure and the degree of desalination required.

Cellulose is a complex polymeric carbohydrate $(C_6H_{10}O_5)_x$, composed of recurring anhydroglucose units, each unit having one primary and two secondary alcohol groups. Cellulose esters are usually formed by complete esterification of the alcohol groups followed by partial hydrolysis to give an average of from 0.1 to 2, usually from 0.2 to 1 free hydroxy groups, i.e., not esterified, per anhydroglucose unit.

Normal secondary cellulose acetate of commerce is prepared by partial hydrolysis of fully acetylated cellulose material. This hydrolysis is carried out only long enough to reduce the acetyl content from about 45% to below 40%, at which point the process is interrupted. The anhydroglucose units which make up the cellulose molecules each have one primary and two secondary alcohol groups, all of which are completely esterified in the initial stages of manufacture of cellulose acetate. Since the rate of deacetylation of esterified primary hydroxyl groups is about ten times higher than that of secondary groups, commercial cellulose acetate contains more free primary alcohol groups than corresponds to the equilibrium distribution. Though this material is preferred for lacquer fabrication, it is not entirely satisfactory for use as reverse osmosis membranes.

It has now been discovered that treatment of cellulose esters, particularly cellulose acetate, in an inert solvent solution of the ester with catalytic amounts of a strong acid, under substantially anhydrous conditions, prior to casting the cellulose ester into films, produces a semipermeable membrane having greatly improved permeation properties of flux rate, solute rejection and useful life in comparison with the cellulose ester membranes of the prior art. For example, the modified cellulose acetate membranes of the instant invention exhibit a salt rejection rate greater than 97.5% at a flux rate of greater than 30 gal./ft.$^2$/day after 200 hours of operation.

The invention procedure provides an improved cellulose ester, and particularly a cellulose acetate, semipermeable membrane having superior flux and solute, e.g., salt, rejection properties, a high resistance to compaction, and a long useful life when used in reverse osmosis precedures for separating liquid mixtures, especially for desalination of salt water.

The invention also provides a improved and economical method for desalination of water by a reverse osmosis process which involves using the improved cellulose ester, particularly cellulose acetate, semipermeable membrane hereof.

The invention is described in detail below, in connection with the accompanying drawings wherein.

Figure 4:
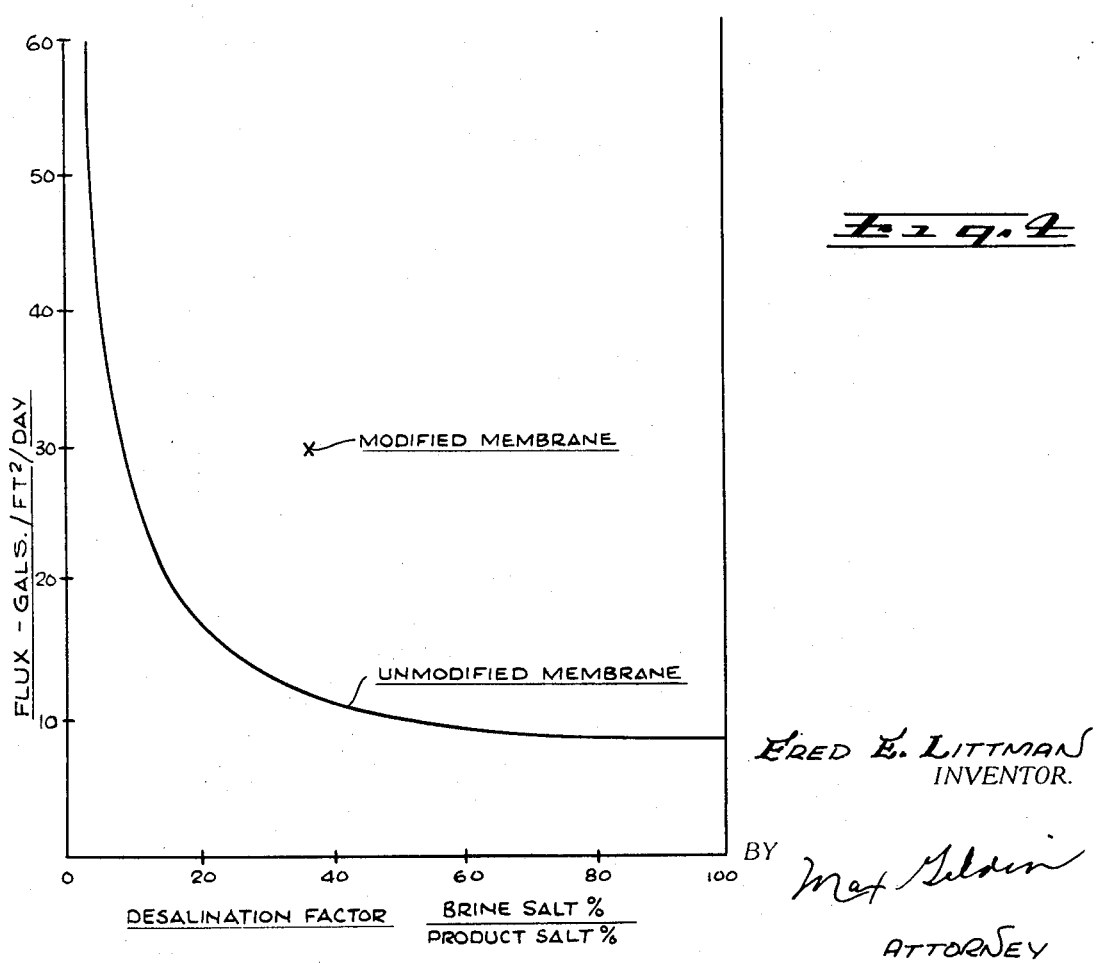

FIG. 4 is a graph showing the comparative permeation properties of membranes made with treated and untreated cellulose acetate Examples of commercially available cellulose esters are cellulose acetate, cellulose acetate-propionate, cellulose propionate, cellulose acetate-butyrate, cellulose butyrate, cellulose acetate-valerate, and cellulose acetate-benzoate. Any cellulose ester capable of being formed into a semipermeable membrane can be treated according to the invention to improve the permeation properties of a membrane formed therefrom. Cellulose acetate is preferred for use in desalination processes because of its particular ability for salt rejection, its availability and low cost. Improved cellulose ester membranes, which have been modified according to the invention are particularly useful in desalination processes. However, the invention is not limited to utilization of the improved membranes hereof in desalination processes but is intended to include their use in other reverse osmosis procedures employing cellulose ester semipermeable membranes. The invention will be described chiefly with reference to the preferred cellulose acetate semipermeable membranes produced by the invention process, although it will be understood that any other cellulose ester can be substituted for the cellulose acetate material in practicing the invention to improve the permeation properties thereof.

The method for modification of cellulose acetate according to the invention involves forming a reaction mixture comprised of cellulose acetate dissolved in an inert organic solvent and sufficient concentrated strong acid catalyst to give an overall concentration in the solution of from 0.001 N to 0.1 N. The exact amount of the solvent to be used is not critical and can range from a stirrable slurry to highly dilute solutions. There is no advantage to these extremes, however, and it is preferred to form about a 5% to about a 20%, and most preferably about a 10%, solution of the cellulose acetate material in the solvent. All percents expressed herein and in the appended claims refer to percents by weight unless otherwise specified. Although any inert organic solvent for cellulose acetate can be used including, among others, glacial acetic acid, dioxane, methyl ethyl ketone, methyl isobutyl ketone and acetone, glacial acetic acid is preferred because it gives consistently best results.

The reaction mixture can be formed by adding solvent to both the cellulose acetate and to the acid and then combining the two mixtures, or alternately adding all of the solvent to the cellulose acetate and adding the acid thereto. When the latter procedure is followed it is desirable to make dropwise addition of the acid with adequate agitation to avoid local acid concentration. The former method is preferred, however, the acid being added, e.g., as a 5% to about a 20% solution in the solvent.

Any strong acid can be used as the catalyst such as hydochloric acid, perchloric acid, sulfuric acid, sulfamic acid, sulfonic acids, such as benzene sulfonic acid and toluene sulfonic acid, and phosphoric acid. Best results have been obtained using inorganic or mineral acids, particularly hydrochloric acid. While an overall concentration of acid in the reaction mixture can range from 0.001 N to 0.1 N, best results have been obtained with an acid concentration of about 0.01 N.

The desultant mixture of cellulose acetate and strong acid in the solvent, is agitated throughout the reaction period, the length of which varies with the reaction temperature and with the concentration of the acid in the reaction mixture. The reaction temperature can range from ambient temperature up to the boiling point of the solvent, but usually is carried out at elevated temperatures. A reaction period of from about ½ to about 4 hours depending upon overall acid concentration is usually sufficient for temperatures of about 50° C to about 100° C. Slightly longer or shorter times may be required for lower and higher reaction temperatures, respectively. The time for reaction in any case should be sufficient to bring about an equilibrium distribution of primary and secondary hydroxyl groups. When this state has been reached, extended reaction times are generally not harmful.

During the reaction according to the invention it is believed that transesterification reaction takes place whereby an equilibrium distribution of the free and combined primary and secondary hydroxyl groups is achieved, as contrasted to the cellulose acetate starting material. The strong acid functions as a catalyst in the reaction, such acid accordingly being employed in small catalytic amounts within the range of acid concentrations noted above. Determination of the endpoint of the reaction is empirical, that is, the reaction should be allowed to proceed for a sufficient period to alter the permeation properties of a semipermeable membrane formed from the treated material. The use of infrared spectroscopy is helpful in detecting the desired change in the primary and secondary hydroxyl group distribution.

It is important that the reaction be substantially anhydrous to avoid acid catalysed hydrolysis. By the term "substantially anhydrous" as used herein and in the appended claims is meant that there should be less than about 1% water in the reaction mixture. The presence of small amounts of water less than the aforementioned 1% are, however, beneficial in increasing reaction rates.

Upon completion of the reaction, the modified cellulose ester is recovered by dilution of the reaction mixture with water to precipitate the cellulose acetate, the modified cellulose acetate removed by filtration, washed several times with water to remove residual acid, and allowed to dry at room temperature. It is then used to form a casting solution from which a film of substantially uniform thickness is cast, forming a reverse osmosis membrane of improved properties.

The membrane is prepared by casting a solution of the cellulose ester, e.g., acetate, material in an organic solvent for the cellulose ester. Any inert solvent for the cellulose ester such as acetone or dioxane, can be used in preparing the casting solution, in amounts sufficient to reduce the viscosity of the casting solution so that it is easily handled. The casting solution also contains a modifier such as magnesium perchlorate, zinc chloride or formamide. A preferred casting solution, for example, comprises 25% cellulose ester, e.g., cellulose acetate, 45% acetone, and 30% formamide.

When the cellulose ester, e.g., acetate, membrane hereof is to be used for desalination of water, it is preferably prepared according to the Loeb-Manjikian method by casting a film of the casting solution on a glass plate base by means of a film casting knife positioned over the glass plate at a distance adjusted to give a film of the desired thickness, usually about 0.0025 inch to about 0.020 inch. After casting, the film, still on the glass plate, is then immersed in ice water, usually about 1° C. to about 5° C., to complete removal of the solvent for a period of from about 3 minutes to about an hour, followed by immersion in hot water, usually about 70° C. to about 90° C., and preferably about 72° C. for about 30 seconds to about an hour or longer depending on the temperature to fix the membrane and to obtain optimum membrane properties. The film membrane is then stripped off the glass plate and cooled by immersion in ambient temperature distilled or deionized water where it is stored until used.

Figure 1:
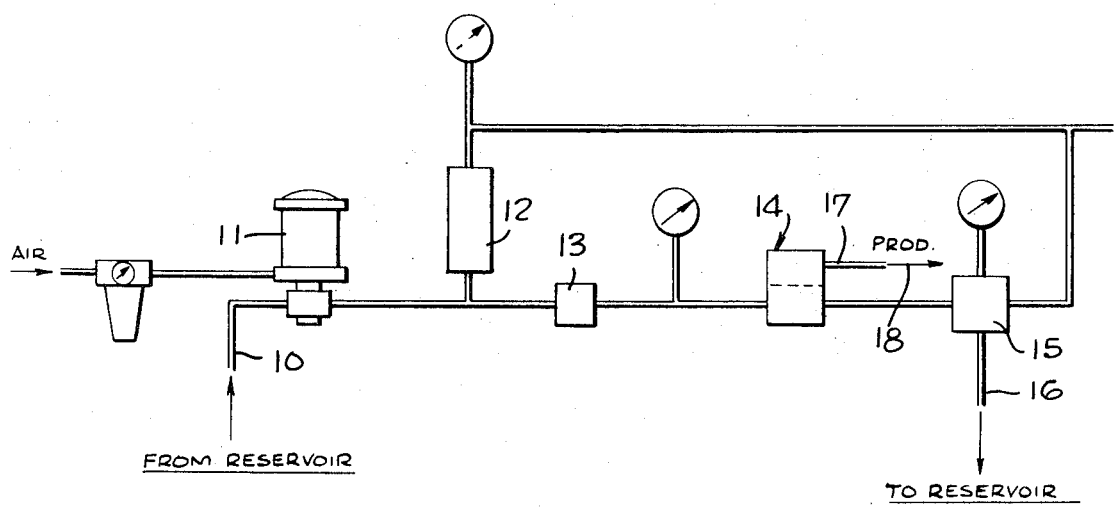
FIG. 1 is a diagrammatical representation of the form of apparatus of system in which desalination tests have been run.
Figure 2:
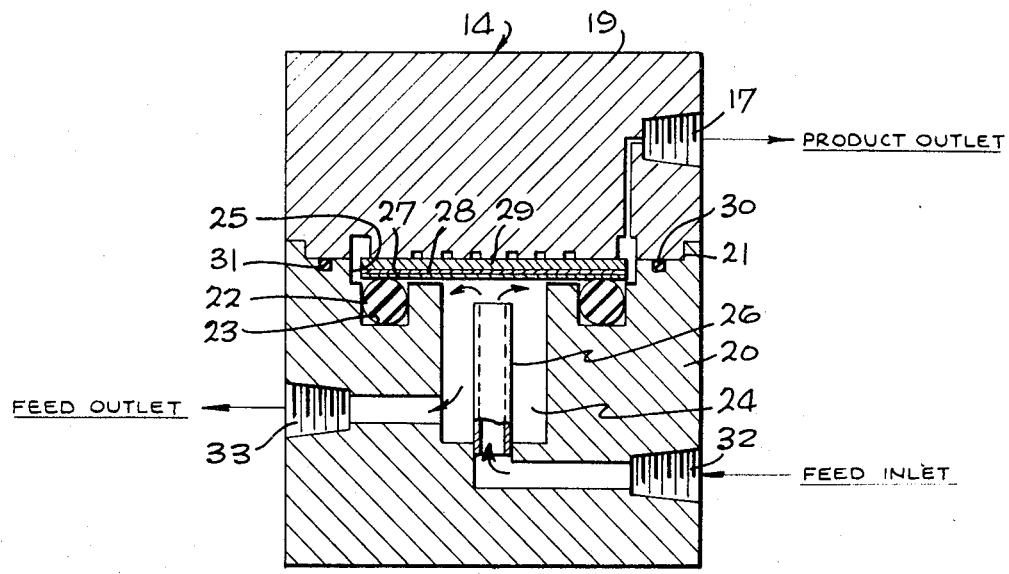
FIG. 2 shows an enlarged sectional view of the reverse osmosis cell shown in FIG. 1.

FIG. 1 of the drawing shows diagrammatically the system in which desalination tests have been run. An enlarged sectional view of the reverse osmosis cell is shown in FIG. 2. In FIG. 1, a saline feed solution can be fed at 10 from a reservoir (not shown). The salt solution is circulated by means of a high pressure pump 11 capable of producing pressures up to 5000 p.s.i. through a stainless steel high pressure loop, wherein the pulsations of the flow are smoothed out by a hydraulic accumulator 12. The pressurized salt solution then passes through a polishing filter 13 into the reverse osmosis cell, indicated at 14, and which is shown enlarged in FIG. 2. The bulk of the stream passes through the cell and returns to the reservoir at 16, after flowing through a back pressure regulator 15 which maintains a preset pressure in the system. The desalinated stream passes through the outlet 17 of cell 14, and is collected separately as product at 18.

The reverse omsosis cell 14, shown in detail in FIG. 2, comprises an upper casing 19 and a lower casing 20. The upper casing has a stepped shoulder which interfits with a corresponding stepped shoulder in the lower casing, as shown at 21. The casings are sealed together by means of an O-ring seal 30 disposed in an annular groove 31 of the lower casing. The lower casing has a central opening or bore 24 serving as a contact chamber, and a counterbore 25 of relatively shallow depth. A steel tube 26 is positioned in the central bore 24. The semipermeable cellulose ester membrane indicated at 27, is positioned in the space of the counterbore at the entrance to the contact chamber, with a back-up paper filter 28, followed by a porous stainless steel back-up plate 29. The peripheral edges of the membrane are sealed by an O-ring seal 22 disposed in an annular groove 23 in the lower casing.

The salt solution passes from the feed inlet 32 through the stainless steel tube 26 into the contact chamber 24 into contact with the membrane 27. The purified water passing through the membrane is withdrawn at the product outlet 17 and the salt enriched solution passes out of the cell through the feed outlet 33.

The following specific examples are presented for the purpose of illustrating the invention and are not intended to be a limitation thereof.

EXAMPLE 1

A reaction vessel equipped with a stirrer and a thermometer was charged with 75.0 g. of Eastman Kodak E–398–10 cellulose acetate understood to have a normal acetal content of 39.8% corresponding to about 55.6% combined acetic acid and 675 ml. of glacial acetic acid. Agitation of the vessel contents was begun and 7.5 ml. of 1 N HCl in 75.0 ml. of glacial acetic acid was charged. An overall concentration of 0.01 N HCl in the resulting mixture was provided, such mixture containing less than 1% water. The resulting mixture was heated to and held at a temperature of 85° C. for 4 hours during which time the mixture was continuously agitated. At the end of this time, the solution was poured with good agitation into 7.5 liters of water to precipitate the treated cellulose acetate material which was then collected by filtration, washed several times with water to remove residual acids, and dried at room temperature. The absorption pattern of a sample of the material examined by infrared spectroscopy indicated that a different ratio of primary and secondary hydroxyl groups was present. Several batches of the modified cellulose acetate as described above were prepared.

The modified cellulose acetate material was then used to prepare a cellulose acetate membrane as described below.

A casting solution was prepared by charging a vessel with 450 g. of acetone and 300 g. of formamide and 250 g. of the treated cellulose acetate material. The resulting solution was mixed by rolling overnight. A film was then cast from the viscous, almost colorless solution using an 8 inch square plate glass base and a film casting knife positioned above the plate at a distance calculated to give a 0.10 inch thick film. After casting, the plate carrying the film was immersed in 4° C. ice water for 1 hour, followed by immersion in hot 78° C. water for 5 minutes. The film was then stripped off the glass plate and stored in distilled water until used for desalination of salt water as described below.

A disc having a 2 inch diameter was cut from the film and mounted in a reverse osmosis pressure cell of the type described in FIG. 2 with the air-dried surface of the membrane in contact with the salt solution, with the back-up disc of filter paper 28 placed between the side of the membrane exposed to the glass plate and the porous stainless steel back-up plate 29.

Figure 3:
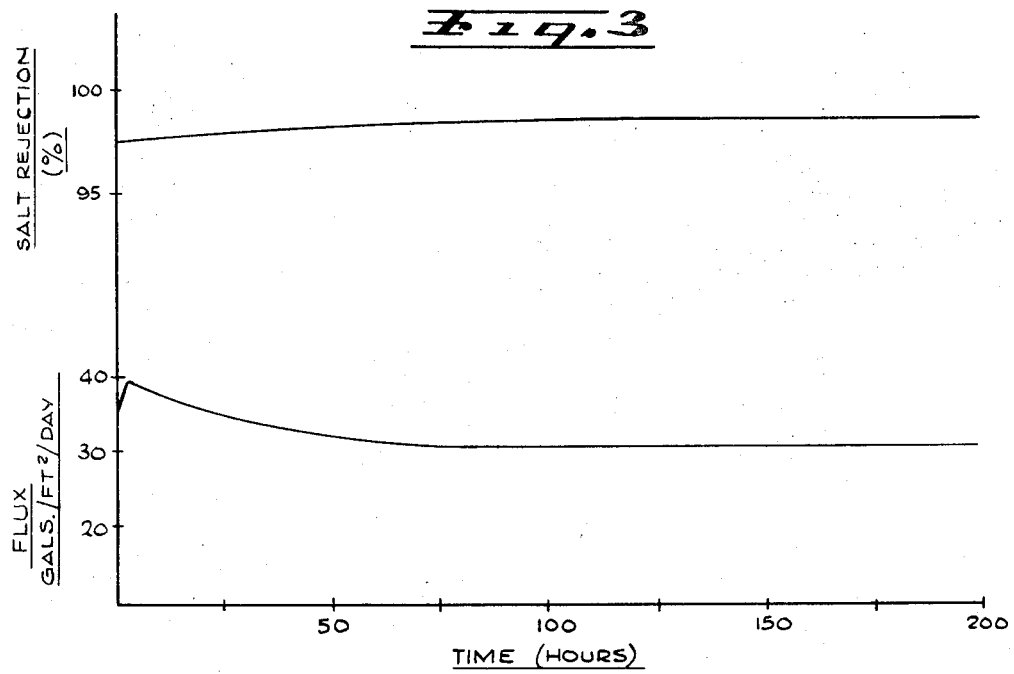
FIG. 3 is a graph showing the salt rejection and flux rate properties of a cellulose acetate membrane made according to the invention.

The system of the type described in FIG. 1 of the drawings was filled with an approximately 1% salt solution and operated for about 200 hours at a pressure of 1000 p.s.i. The salt rejection and flux performance against time, of the membrane is shown in FIG. 3, where it can be seen, for example, that fluxes in excess of 30 gal./ft.$^2$/day were obtained up to 200 hours or move with a salt rejection of the order of 97.5%. The flatness of the time-flux and time-salt rejection relationships indicate that such performance can be expected for long periods of time representing improved operating economies.

For purposes of comparison, a semi-permeable membrane was prepared following the procedure used above for casting a membrane except that untreated cellulose acetate was used in place of the cellulose acetate treated according to the invention. A disc having a 2 inch diameter was cut from the membrane and placed in the cell as above described. Salt rejection is expressed in FIG. 4 in terms of a desalination factor which is the percent brine salt divided by the percent product salt. The curve in FIG. 4 shows the desalination factor of an unmodified cellulose acetate membrane for varying rates of flux. The $x$ represents the comparative performance of the modified membrane produced in Example 1 according to the invention. The graph shows that for a flux rate of about 30 gal./ft.$^2$/day a desalination factor of 37 is obtained for the modified membrane of the invention as compared to a much lower desalination factor of only about 8 for the unmodified membrane, indicating that the modified membrane exhibits a much greater salt rejecting capability than the unmodified membrane.

EXAMPLE 2

A reaction vessel equipped with a stirrer and a thermometer is charged with 300 g. of cellulose acetate and sufficient methyl ethyl ketone to give a total volume of 1480 ml. Agitation is begun and a solution of 2 N sulfuric acid in methyl ethyl ketone is charged. The overall acid concentration is about 0.005 N, and the water content is less than 1%. Heat is applied to the reaction vessel to bring the temperature of the reaction mixture to and maintain it at 79° C. for a period of 4 hours during which time there is continuous agitation of the vessel contents. At the end of this time, water is added to precipitate the cellulose acetate which is then recovered by filtration, washed several times with water to remove residual acids, and allowed to dry at room temperature.

The modified cellulose acetate material is then used to prepare a cellulose acetate membrane according to the procedure outlined in Example 1. When used in a reverse osmosis cell as described in Example 1, the membrane shows superior flux rate and salt rejection properties and a high resistance to compaction.

EXAMPLE 3

A 2 liter reaction vessel equipped with a stirrer and a thermometer is charged with 300 g. of cellulose acetate and sufficient acetone to give a total volume of 989 ml. Agitation is begun and a 5% solution of concentrated phosphoric acid in acetone is charged, to give an overall acid concentration of 0.008 N. Heat is applied to the reaction vessel to bring the temperature of the reaction mixture to and maintain it at 55° C. for 6 hours during which time there is continuous agitation of the vessel contents. At the end of this time, water is added to precipitate the cellulose acetate which is then recovered by filtration, washed several times with water to remove residual acid, and allowed to air dry at room temperature.

The modified cellulose acetate material is then used to prepare a cellulose acetate membrane according to the procedure outlined in Example 1. When used in a reverse osmosis cell as described in Example 1, the membrane shows superior flux and salt rejection properties and a high resistance to compaction.

EXAMPLE 4

A 1 liter reaction vessel equipped with a stirrer and a thermometer is charged with 300 g. of cellulose acetate and sufficient dioxane to give a total volume of 575 ml. Agitation is begun and a 15% solution of anhydrous o-toluene sulfonic acid dissolved in dioxane, is charged in a slow stream, to provide an overall concentration of 0.05 N, the reaction mixture containing less than 1% water. Heat is applied to the reaction vessel to bring the temperature of the reaction mixture to and maintain it at 45° C. for 2 hours during which time there is continuous agitation of the vessel contents. At the end of this time, water is added to precipitate the cellulose acetate which is then collected by filtration, washed several times with water to remove residual acid, and allowed to dry at room temperature.

The modified cellulose acetate material is then used to prepare a cellulose acetate membrane according to the procedure outlined in Example 1. When used in a reverse osmosis cell as described in Example 1, the membrane exhibits superior flux and salt rejection properties and a high resistance to compaction.

Various modifications are contemplated and may be resorted to by those skilled in the art without departing from the spirit and scope of the invention as defined by the appended claims.

I claim:

1. In a method for producing a semipermeable cellulose ester membrane which comprises dissolving the cellulose ester in an inert organic solvent to form a casting solution, and casting the solution to form a membrane of substantially uniform thickness, and immersing the cast membrane in water; the improvement which comprises using cellulose ester material which has been modified by a method which comprises stirring under substantially anhydrous conditions a reaction mixture comprising an inert organic solvent solution of an organic cellulose ester and sufficient strong acid catalyst to give an overall concentration in said solution of from about 0.001 N to about 0.1 N; at a temperature ranging from ambient temperature up to the boiling point of the solvent, producing a transesterification of said cellulose ester, until an equilibrium distribution of the primary and secondary hydroxyl groups of the cellulose ester has taken place.

2. A method as defined in claim 1, wherein the cellulose ester is selected from the group consisting of cellulose acetate, cellulose acetate-propionate, cellulose propionate, cellulose acetate-butyrate, cellulose butyrate, cellulose acetate-valerate, and cellulose acetate-benzoate.

3. A method as defined in claim 1, wherein the cellulose ester is cellulose acetate.

4. A method as defined in caim 1, wherein said acid catalyst is a strong acid selected from the group consisting of hydrochloric, perchloric, sulfuric, sulfamic, benzene sulfonic, toluene sulfonic and phosphoric acids.

5. A method as defined in claim 1, wherein said cellulose ester is cellulose acetate, said strong acid is hydrochloric acid, and said inert organic solvent is glacial acetic acid.

6. A method as defined in claim 1, wherein the acid catalyst is a strong mineral acid, the inert solvent solution of cellulose ester comprises about 5% to about 20% cellulose ester and the acid catalyst is added as a 5% to about a 20% solution in the solvent.

7. A method as claimed in claim 1, wherein a solution of cellulose acetate in glacial acetic acid is treated with a solution of HCl in glacial acetic acid at a temperature of about 50° C. to about 100° C. for a period of about ½ to about 4 hours.

8. A method as claimed in claim 1, wherein a solution of cellulose acetate in glacial acetic acid is treated with a solution of HCl in glacial acetic acid at a temperature of about 85° C. for from about 4 hours, the overall acid concentration of the reaction mixture being about 0.01 N and said reaction mixture containing less than about 1% water.

9. A semipermeable cellulose ester membrane produced by the method of claim 1.

10. A semipermeable cellulose acetate membrane as defined in claim 9, wherein said organic cellulose ester is cellulose acetate, said strong acid catalyst is hydrochloric acid, and said first-mentioned organic solvent is glacial acetic acid.

References Cited

UNITED STATES PATENTS

| | | | |
|---|---|---|---|
| 2,319,051 | 5/1943 | Fordyce et al. | 264—217 |
| 2,418,942 | 4/1947 | Morgan | 260—227X |
| 2,772,266 | 11/1956 | Malm et al. | 260—227 |
| 2,860,132 | 11/1958 | White et al. | 260—227 |
| 2,926,104 | 2/1960 | Goetz | 264—41X |
| 3,051,543 | 8/1962 | Skogseid | 260—227X |
| 3,084,990 | 4/1963 | Hoffman | 260—227X |
| 3,089,870 | 5/1963 | Mench et al. | 260—227 |
| 3,089,871 | 5/1963 | Malm et al. | 260—227 |
| 3,109,743 | 11/1963 | Fleck et al. | 260—227X |
| 3,133,132 | 5/1964 | Loeb et al. | 264—49 |
| 3,331,772 | 7/1967 | Brownscombe et al. | 264—41UX |

OTHER REFERENCES

Morrison, Robert Thornton: Organic Chemistry, Boston, Allyn and Bacon, © 1959, page 484, title page.

PHILIP E. ANDERSON, Primary Examiner

U.S. Cl. X.R.

106—196; 210—23; 264—49, 207, 217, 330